US010684634B1

United States Patent
Yang et al.

(10) Patent No.: US 10,684,634 B1
(45) Date of Patent: Jun. 16, 2020

(54) METHOD AND SYSTEM FOR COMPENSATING FOR TEMPERATURE RISE EFFECTS

(71) Applicant: QUANTA COMPUTER INC., Taoyuan (TW)

(72) Inventors: Chih-Wei Yang, Taoyuan (TW); Chih-Hao Chang, Taoyuan (TW); Ching-Jung Liu, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 16/262,277

(22) Filed: Jan. 30, 2019

(51) Int. Cl.
*G01R 15/14* (2006.01)
*G01R 19/00* (2006.01)
*G06F 1/30* (2006.01)
*G05D 23/19* (2006.01)
*G06F 1/28* (2006.01)
*G06F 1/26* (2006.01)
*H02M 1/00* (2006.01)

(52) U.S. Cl.
CPC ........... *G05D 23/1917* (2013.01); *G06F 1/28* (2013.01); *G06F 1/26* (2013.01); *H02M 2001/0025* (2013.01)

(58) Field of Classification Search
CPC .. G06F 1/26; G06F 1/28; G06F 1/305; H02M 2001/0025; H02M 3/28; G05D 23/1917
See application file for complete search history.

(56) References Cited

U.S. PATENT DOCUMENTS

| 3,569,736 A * | 3/1971 | Tschinkel | G01J 1/44 327/350 |
| 8,775,151 B2 * | 7/2014 | Algaonkar | G01K 11/32 385/13 |
| 8,907,653 B2 * | 12/2014 | Lee | G05F 3/245 323/313 |
| 9,727,067 B2 * | 8/2017 | Fujiwara | G05F 1/575 |
| 2011/0218790 A1 * | 9/2011 | Algaonkar | G01K 11/32 703/13 |
| 2013/0300393 A1 * | 11/2013 | Lee | G05F 3/02 323/304 |
| 2016/0054749 A1 * | 2/2016 | Fujiwara | G05F 1/575 323/273 |
| 2016/0241068 A1 * | 8/2016 | Zhao | H02J 7/022 |
| 2016/0254752 A1 * | 9/2016 | Wood | G06F 1/305 363/15 |

(Continued)

Primary Examiner — Abdelmoniem I Elamin
(74) Attorney, Agent, or Firm — Nixon Peabody LLP (57) ABSTRACT

A system and method for detecting and compensating for temperature effects in a device having a power supply and a remote node. The system includes a power supply unit having an adjustable voltage output and a feedback circuit. The voltage output is adjusted based on the output of the feedback circuit. A power path is coupled to the power supply unit. The power path has power connectors to supply voltage from the power supply unit to a remote node. The remote node is operable to sense a voltage drop of the power path at the remote node associated with temperature effects on the power connectors. An adjustable resistor has an output coupled to the feedback circuit. A controller is coupled to the remote node and the adjustable resistor. The controller determines a resistance value to compensate for the temperature effects and sets the adjustable resistor to change the power output.

18 Claims, 8 Drawing Sheets

(56) References Cited

U.S. PATENT DOCUMENTS

2016/0308383 A1* 10/2016 Teo ................... H02J 7/0077
2018/0152036 A9* 5/2018 Zhao ............... H02M 3/33507
2019/0214161 A1* 7/2019 Chen ................... B60L 53/18

* cited by examiner

METHOD AND SYSTEM FOR COMPENSATING FOR TEMPERATURE RISE EFFECTS

TECHNICAL FIELD

The present disclosure relates generally to power systems for a multi-node chassis. More particularly, aspects of this disclosure relate to compensating and determining the effects of temperature rise effects on mechanical current carrying components in a multi-node chassis.

BACKGROUND

The emergence of the cloud for computing applications has increased the demand for off-site installations, known as data centers, that store data and run applications accessed by remotely connected computer device users. A typical data center has physical chassis structures with attendant power and communication connections. Each rack may hold multiple network devices such as computing and storage servers and may constitute a multi-node server system.

A conventional multi-node chassis server system typically includes a chassis management controller, a plurality of computing nodes, a cluster of hard disks (termed the storage node); a cluster of all of the power supply units (PSU) on a power distribution board (PDB); and a midplane to connect all the functional boards. Each of the computing nodes can include a baseboard management controller (BMC), a platform controller hub (PCH), and one or more central processing units (CPU). The BMC manages power and operating parameters for the node. A chassis management controller (CMC) can be provided to communicate with the BMC of each node by Intelligent Platform Management Interface (IPMI) commands. The CMC will get information relating to the multi-node system to control or monitor the power supply units on the PDB.

The power supply units supply electrical power to an entire multi-node chassis server system. The primary function of a power supply unit is converting electric power from an AC source to the correct DC voltage and DC current for powering components on the server system. The power from the power supply unit is supplied via mechanical components, such as cables, to other server system boards, such as those for computing nodes, storage devices, and fans.

One effect occurring with a multi-component chassis is a temperature rise generated by large currents flowing through mechanical components to the nodes. The temperature rise is generated primarily from connectors or cables that have larger electrical contact or conductive resistance. According to the Joule effect, when large currents flow through mechanical components, the temperature will increase. Such temperature rises cause plastic aging and insulation recession in connectors and cables, thereby resulting in damage or burnout of the server system.

In prior server system designs, more mechanical components will be used to meet high-current design specifications (such as a system full loading current rate and a temperature rise of less than 30 degrees) to compensate for the effects of temperature rise. The standard response to protection against temperature rise is over-designing mechanical components for reliability. Such overdesign results in more expensive components.

All mechanical components carrying current in normal use have a resistance. Current passing through the mechanical components causes a voltage drop and thus a temperature rise. The voltage drop is a power loss equal to the product of voltage drop and current flow. Thus, the voltage drop, V, may be calculated by $V = I \times R$; where V=the voltage drop across a connector or cable, I=the system loading current, and R=the resistance of the connector or cable. The power loss, P, may be calculated by $P = V \times I = IR \times I = I^2 R$, where P=the power loss of the system.

The PSUs compensate for the loss of power from voltage drops caused by the temperature rise of mechanical components by reading a remote sensing signal to determine the voltage drop. Therefore, in known power systems, the output of a PSU is increased to a higher voltage level by adjusting a feedback signal from the remote output voltage of the PSU. As a result, the current will be reduced after the system voltage is increased, thereby reducing the temperature rise effect of the mechanical components of the power system. As a result, the lifetime of these components is extended.

Figure 1:
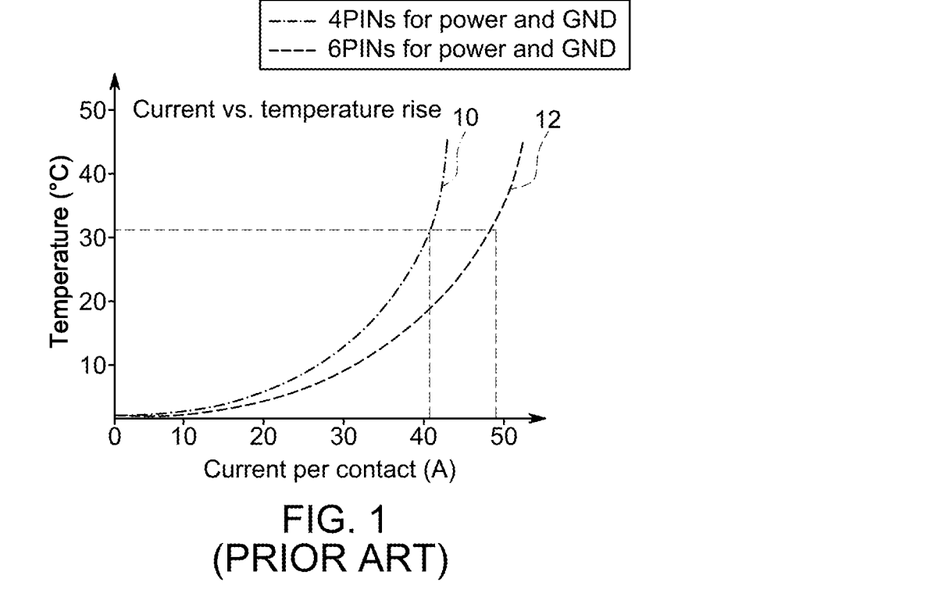
FIG. 1 is a graph showing conventional differences in resistance due to temperature change.

In system design, de-rating is an intentional process that applies to every component of a server system to reduce the opportunity of a component witnessing more stress than it is capable of withstanding. Based on de-rating considerations, the mechanical components selected (such as the lower number of American Wire Gauge [AWG] ratings) must meet the system design requirements (e.g., full loading current, voltage level, . . . etc.). The relevant document for assessing temperature rises is the EIA 364 D: TP-70B paper, titled "Temperature Rises vs. Currents of Electrical Connectors and Sockets" (June 1997), published by the Electronic Components Industry Association (ECIA). As explained in this paper, the current rating is based on the temperature rise of a connector under current flow. The temperature rise is defined as the difference between the ambient temperature and the hottest point, the hot spot, on the energized contact. The most common temperature rise criterion is a 30-degree Centigrade difference. FIG. 1 is a graph showing conventional temperature rise charted against current per contact. The graph shown in FIG. 1 includes a curve 10 that represents temperature rise in relation to current for a four pin power assignment and a curve 12 that represents temperature rise in relation to current for a six pin power assignment.

Figure 2:
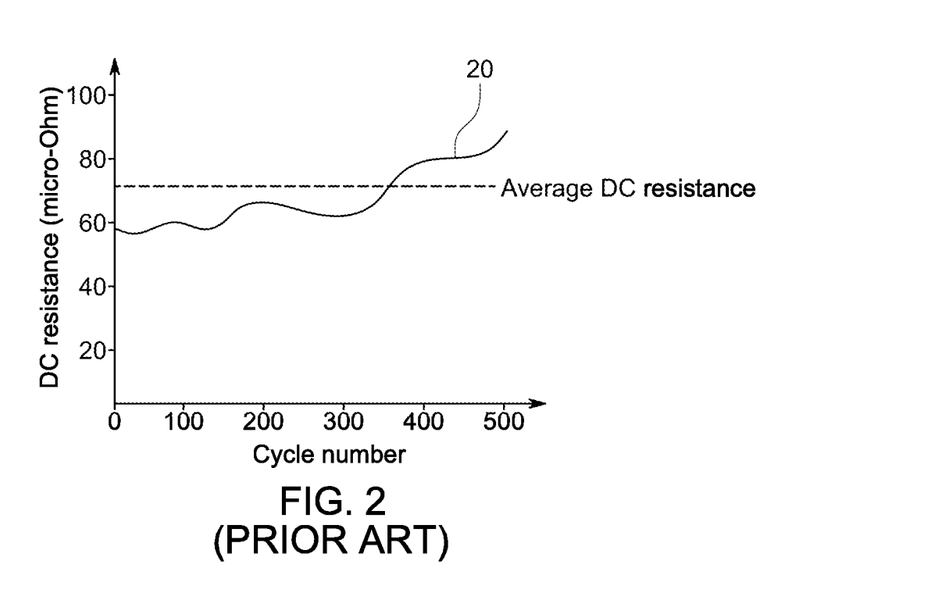
FIG. 2 is a graph of conventional resistance over time for a prior art connector.

FIG. 2 is a resistance curve graph for a conventional connector. The graph in FIG. 2 shows a line 20 that represents the resistance of the connector over time. Aging is defined as the cumulative effects that occur over time to mechanical components. If unchecked, these effects can lead to loss of functionality and a potential reliability issues. The effects may be charted by a power connector datasheet or vendor provided data of power cycle to DC resistance. Although the effects of temperature rise are generally known, there is no way to predict when such effects will impede the operation of mechanical components, resulting in system failure.

Power supply units convert the AC voltage to the DC voltage according to the system design, and a remote sensor compensates the output for the sensed voltage drop. The output voltage of the power supply unit is guaranteed to meet certain upper and lower limit values of a predetermined operational zone. For example, a 12 V power supply unit may have a typical output of 12 V, a minimum output of 11.4 V, and a maximum output of 12.6 V.

The conditions for over-voltage protection are generally detected locally. The power supply generally shuts down in a latch-off mode upon an over voltage condition on the DC output. This latch may be cleared by toggling the PSON signal or by an AC input re-cycle/re-plug. The PSU output voltage levels are measured at the pins of PSU card edge receptacle with minimum and maximum output loads. Traditional designs of power sensing and feedback do not detect power connector status and predict for the power connector thermal aging and life. Thus, prior art systems suffer from the effect of repetitive transients on the insulation lifetime and dielectric capabilities. In the past designs, there is no detection or monitoring of power connector temperature rise and subsequent voltage drop. Therefore, the system does not detect the effect of temperature rises on the mechanical components.

Thus, there is a need for feedback voltage drop reporting across all nodes of a multi-node system at a particular node for detecting temperature rises in mechanical connection components. There is a further need for a system that allows adjusting power to address temperature rise effects in mechanical connection components. There is a further need for a detection system to predict when mechanical connector components may fail because of temperature rise effects. There is also a need for an intelligent neural network to determine optimal values to address temperature rise effects and provide data to predict the failure of mechanical components from temperature rise effects.

SUMMARY

One disclosed example is a sensing and compensation system for temperature effects based on current carried by power connectors. The system includes a power supply unit having an adjustable voltage output and a feedback circuit. The voltage output is adjusted based on the output of the feedback circuit. A power path is coupled to the power supply unit. The power path has power connectors to supply voltage from the power supply unit to a remote node. The remote node is operable to sense a voltage drop of the power path at the remote node associated with temperature effects on the power connectors. An adjustable resistor has an output coupled to the feedback circuit. A controller is coupled to the remote node and the adjustable resistor. The controller is operable to determine a resistance value to compensate for the temperature effects and set the adjustable resistor to the determined resistance value to change the power output.

Another disclosed example is a method of compensating temperature effects on power connectors for a system. The system has a power supply unit; a power path coupled to an output of the power supply unit; a remote node powered by the power supply unit through the power path and the power connectors; and an adjustable resistor having an output coupled to a feedback circuit of the power supply unit to regulate the output of the power supply unit. A voltage drop of the power path at the remote node associated with temperature effects on the power connectors is sensed. A resistance value for the adjustable resistor is determined based on the sensed voltage drop via a controller. The resistance of the adjustable resistor is adjusted to change the output of the power supply unit to compensate for the temperature effects.

Another disclosed example is a system sensing and compensating for temperature effects on power components. The system includes a power distribution board and a power supply unit mounted on the power distribution board. The power supply unit includes a feedback circuit and an adjustable voltage output. The system includes a computing node, a storage backplane node, and a fan board node. Each of the nodes is coupled to the adjustable voltage output of the power supply unit via power connectors. The fan board node includes fans in proximity to the power connectors. A controller is mounted on the power distribution board. The controller is operable to control the speed of the fans on the fan board node. The controller receives voltage drop data from each of the nodes, and temperature data from temperature sensors on the power connectors. An adjustable resistor is coupled to the controller. The adjustable resistor is coupled to the feedback circuit. A neural net executed by the controller determines a value for the adjustable resistor to control voltage output of the power supply unit, and a fan speed for the fans to compensate for temperature effects of the power connectors.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The disclosed system provides a mechanism to control the effect of temperature rise in power connectors through dynamic system voltage level adjustment. The mechanism can intelligently determine the system voltage level by a PSU feedback signal adjustment based on operation parameters of the mechanical power components, such as voltage drop and temperature rise. The system may also determine mechanical aging properties of mechanical components such as power connectors. The system may also determine operation parameters such as fan current and loading current to address temperature rise effects of the power components. The advantage of this mechanism is to reduce the number of components needed to compensate for temperature rise. The mechanism intelligently prevents temperatures from rising above a certain level (e.g., more than 30 degrees C.) that would impede power connector operation, while meeting system current ratings. Therefore, this mechanism can reduce system power loss while a system is running on full-load and predict the aging of connectors. The effects of temperature rise are preventing by using a variable resistor to feedback a control signal to increase system voltage. An increase in system voltage and the corresponding system current decrease will result in the same power consumption level. The decrease in system current causes the voltage drop across mechanical components to decrease and thus the effects of temperature rise are reduced. The reduction of temperature rise effects allows the extension of the lifetime of mechanical components. Further, the voltage drop and current data for mechanical components may be obtained to determine the resistance of the mechanical components to predict aging, to control fan speed and to control on/off timing for nodes to avoid inrush current issue to enhance system reliability.

Figure 3:
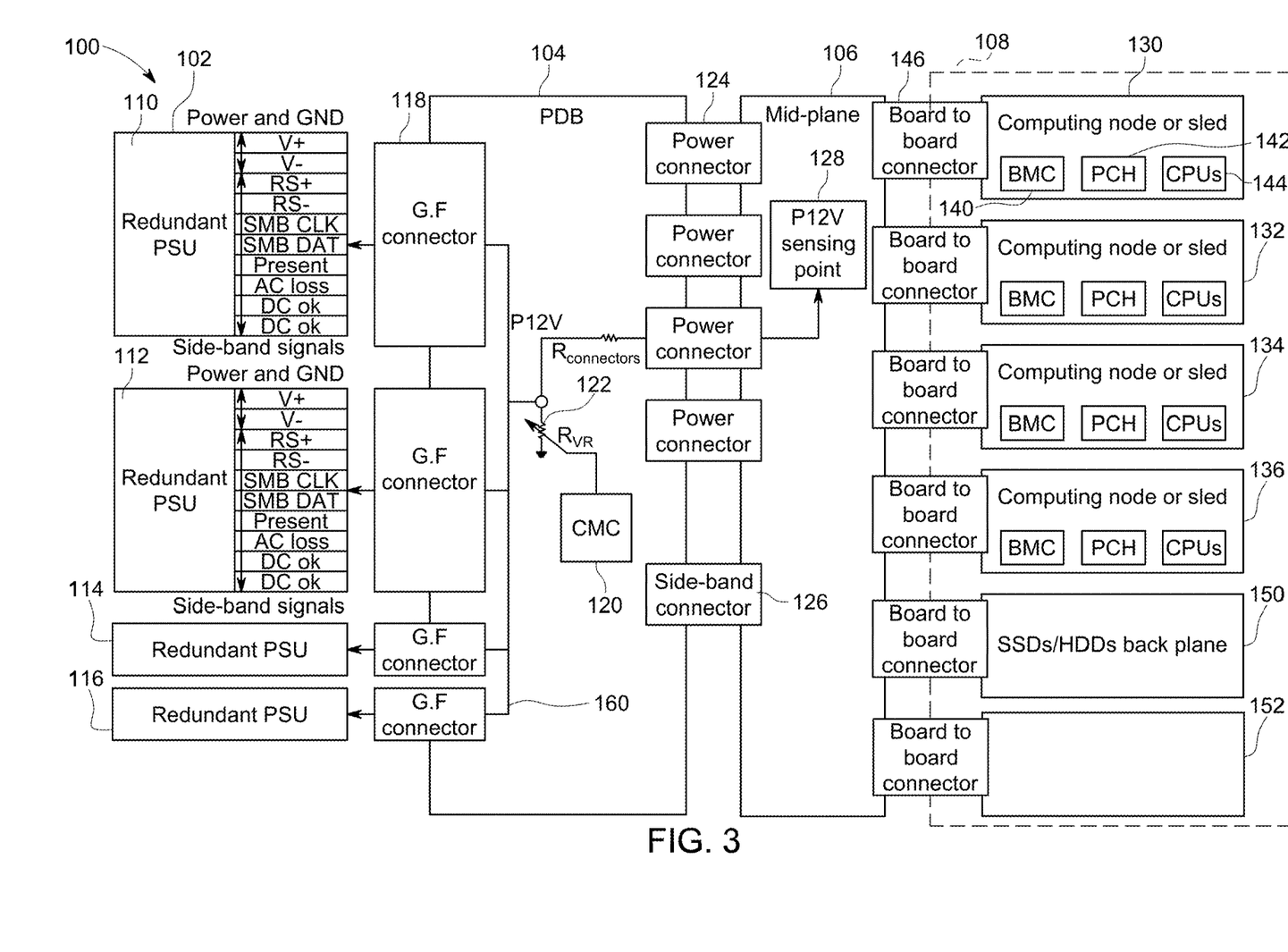
FIG. 3 is a block diagram of an example multi-node system that includes a system for detection and mitigation of temperature rises.

FIG. 3 is a block diagram of an example 2U-4N chassis server system 100 that includes a system for detecting and addressing the effects of temperature rise on power connectors. The system 100 includes a PSU module 102, a power distribution board 104, a midplane 106, and a device module 108. In this example, the PSU module 102 includes four PSUs 110, 112, 114, and 116. Each of the PSUs 110, 112, 114, and 116 convert AC power to DC power, and provide DC output voltages to the power distribution board module 104 via ground fault (GF) connectors 118. The GF connectors 118 include a set of power and ground pins, and a set of data pins that enable the PSUs 110, 112, 114, and 116 to receive data relating to operational parameters from a power bus.

The power distribution board module 104 includes a chassis management controller (CMC) 120 and a digital variable or adjustable resistor 122. The variable resistor 122 is electrically adjustable with an input resistance value to set a resistance value. Power connectors 124 connect the power distribution board 104 to the midplane 106. A side board connector 126 provides input signals to the CMC 120. The midplane 106 includes a sensing point 128 that is connected to the variable resistor 122.

The device module 108 includes computing nodes 130, 132, 134, and 136. The computing nodes 130, 132, 134, and 136 may be servers or other computing devices that are mounted in removable sleds. The removable sleds and their corresponding computing nodes may be hot plugged into the chassis system 100 to receive power and exchange operational data such as power consumption levels. The computing nodes 130, 132, 134, and 136, each include a baseboard management controller (BMC) 140, a platform controller hub (PCH) 142, and at least one CPU 144. The computing nodes 130, 132, 134, and 136 all draw power from board to board power connectors 146. The overall power path thus leads from the output of the power supply units 110, 112, 114, and 116 to the power connectors 146. The device module 108 may also include a storage device backplane, such as a HDD backplane 150, that mounts storage devices such as hard disk drives. Other storage devices such as solid state drives (SSD) may be used instead. The device module 108 also includes cooling devices such as fans mounted on a fan board 152.

As explained above, all of the devices are powered by the PSUs 110, 112, 114, and 116 in the PSU module 102. A bus, which can be an Intelligent Platform Management Bus (IPMB), allows the BMCs 140 of the nodes 130, 132, 134, and 136 to communicate with the CMC 120 on the power distribution board 104.

Thus, the CMC 120 will communicate with a hot-plugged node, such as the node 130, by an Intelligent Platform Management Interface (IPMI) command on the IPMB bus. The CMC 120 will provide a BMC node number to the node when the sled is inserted into the chassis system 100. Each of the BMCs 140 monitor the main board status including voltage, current, temperature and more for their respective nodes. Each of the BMCs 140 provides the main board information of the node to the CMC 120 through the IPMB bus connected via the side-band connector 126. The CMC 120 monitors the power consumption of the HDD backplane 150 and the fans on the fan board 152 via sensors. The CMC 120 also controls the PSUs 110, 112, 114, and 116, and receives other operational data from the server system 100 via a power management bus 160.

Figure 4:
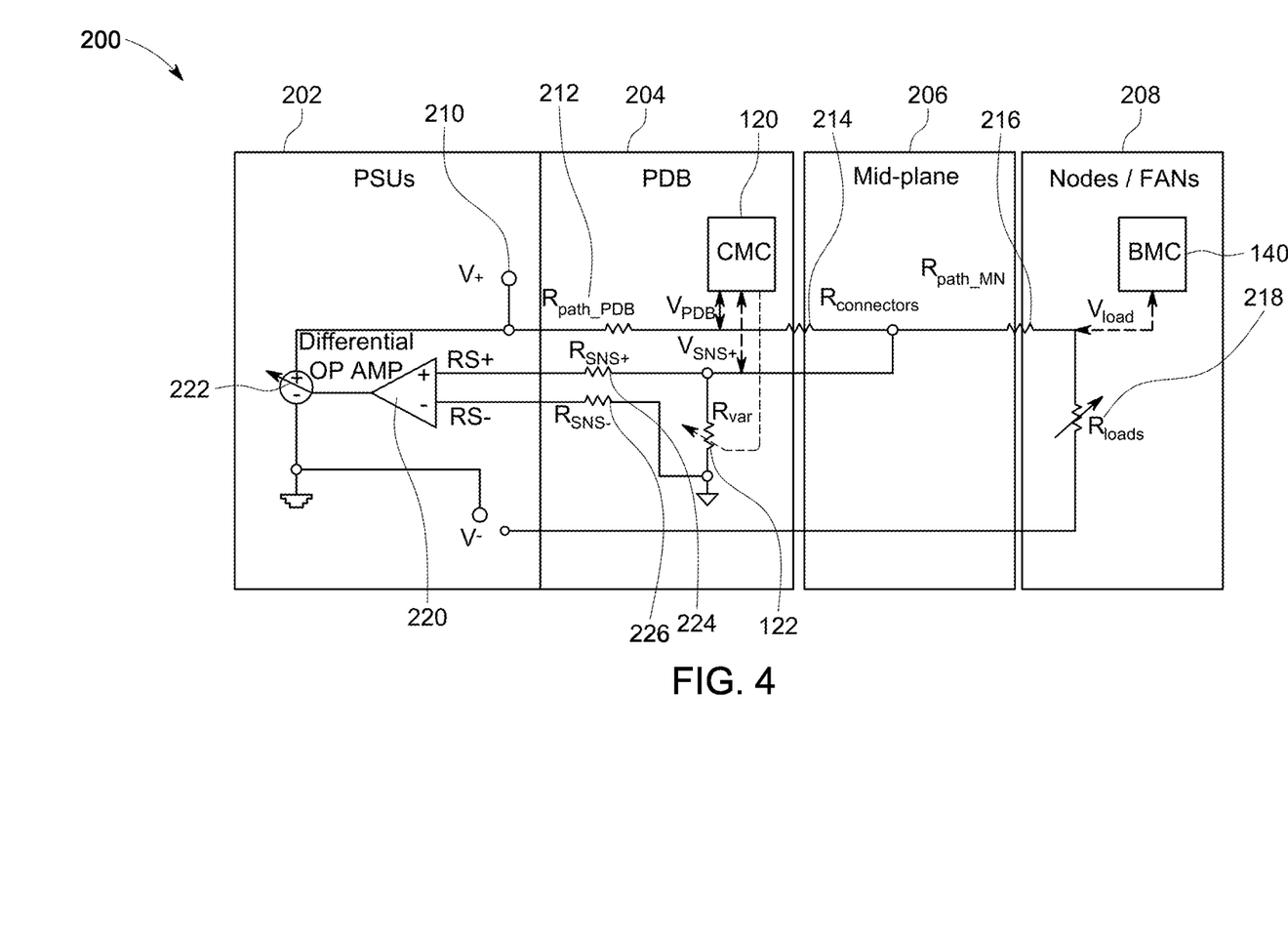
FIG. 4 is an equivalent circuit diagram of an example remote sensing system for a single server system.

FIG. 4 is an example of a voltage-drop compensation equivalent circuit 200 for detecting and mitigating temperature rise effects in the system 100 in FIG. 3. The BMC 140 for any of the nodes in such a system can use digital signals of sensed voltages and convert, filter, and average analog signals to allow the circuit 200 to compensate for voltage drop. The equivalent circuit 200 includes a PSU equivalent circuit 202 representing the PSU module 102 in FIG. 3; a power distribution board equivalent circuit 204 representing the power distribution board 104 in FIG. 3; a midplane equivalent circuit 206 representing the midplane 106 in FIG. 3; and a load equivalent circuit 208. The load equivalent circuit 208 represents the nodes 130, 132, 134, and 136, the HDD backplane 150, and the fan board 152 in FIG. 3. The power distribution board equivalent circuit 204 includes the CMC 120 with an input connected to a voltage rail 210 from the PSU equivalent circuit 202. The power distribution board equivalent circuit 204 includes a resistor 212 ($R_{path\_PDB}$) that represents the resistance of the components of the power distribution board. A connectors resistor 214 represents the resistance of the connectors between the power distribution board 104 and the midplane 206. A path resistor 216 ($R_{path\_MN}$) represents the resistance of the electrical connectors between the midplane and the nodes. The load equivalent circuit 208 includes a variable resistor 218 ($R_{Loads}$) that represents the resistance of the nodes. The resistor 218 is variable because it reflects the overall resistance of the nodes, that may be individually powered on or off, as well as each consuming different power levels.

The PSUs equivalent circuit 202 includes an operational amplifier 220 and a variable voltage source 222. One input of the operational amplifier 220 is connected to the power rail 210 at the midplane equivalent circuit 206. The other input of the operational amplifier 220 is connected to ground. The output of the operational amplifier 220 serves as the feedback signal to allow adjustment of the voltage source 222. As seen in FIG. 4, the variable resistor 122 is connected between the inputs of the operational amplifier 220. Thus, the resistance of the variable resistor 122 may be adjusted by the CMC 120 to control the output of the operational amplifier 220. A remote sensing path is thus defined by the voltage drop due to the connectors between the midplane and the nodes (resistor 216) and the currently powered nodes (resistor 218).

As seen in FIGS. 3-4, the digital variable resistor 122 and a serial interface is added to the remote sensing path of the PSUs 110, 112, 114 and 116. When there is a light load or no installed node, the CMC 120 will initialize and calibrate the digital variable resistor 122 by serial communication; and detect the voltage between a remote sensing positive location represented by a resistor 224 ($R_{SNS+}$) and a remote sensing negative input 226 ($R_{SNS-}$) in FIG. 4.

Figure 5:
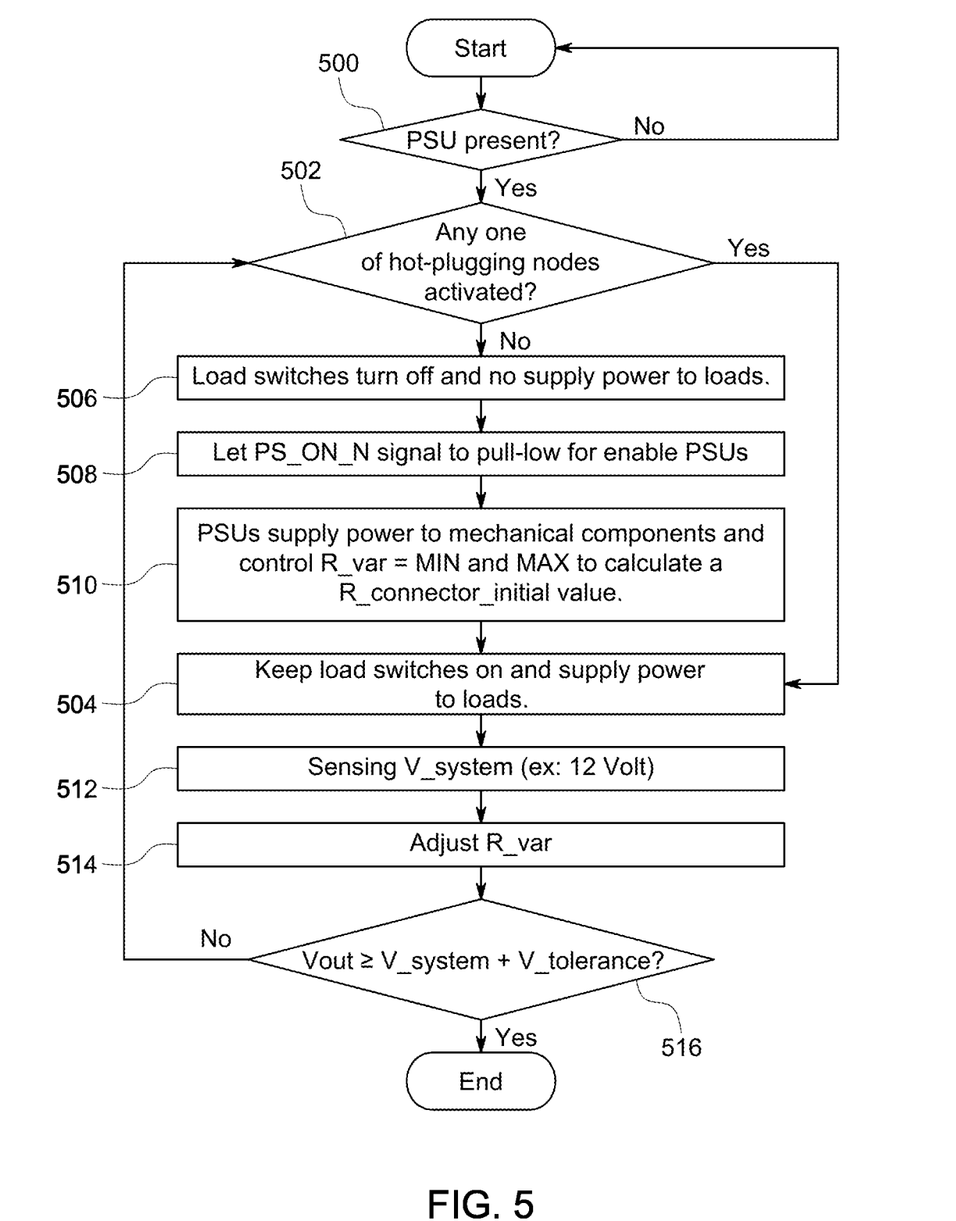
FIG. 5 is a flow diagram of the initialization and calibration routine executed by the CMC in the system shown in FIG. 3.

FIG. 5 shows the initialization and calibration routine run by the CMC 120 when there is no installed node. The CMC 120 will first determine whether the PSU is turned on (present) and the load switch is activated for keeping power on during the initialization (500). The CMC 120 will then determine whether any hot-plugged node has been activated (502). If a hot-plugged node has been activated, the CMC 120 will keep the load switches turned on the supply power to the loads (504). If a hot-plugged node has not been activated, the CMC 120 will turn the load switches off and thus no power is supplied to the nodes (506). The PS_ON signal is then pulled low in order to enable the PSUs to provide the power supply (508). The PSUs then supply power to the mechanical components and to a default resistor (R_var) controlled by the CMC 120. Thus, the R_var (MIN-MAX value by component spec.) can be controlled to obtain the initial value of the resistance of the connectors (510). The mechanical components in this example may include the power connector, power cable, and metal sheet. After either the load switches are turned off and power is supplied to the mechanical components (510) or the load switches are turned on (504), the voltage level of the system is sensed (512). In this example, the system voltage is the output of the PSU and nearby nodes at a designated sample time. The CMC 120 then adjusts the R_var to increase or decrease the output voltage of the PSUs to match system requirements (514). Thus, the R_var value approaches or is the average value of the variable loads on the signal node or of the multiple nodes in the server system. The CMC 120 then determines whether the output voltages from the PSUs are greater than the system voltage and a tolerance voltage value (516). If the output voltage is less than the system voltage and a tolerance voltage, the CMC 120 loops back and determines whether any nodes have been activated (502). If the output voltage is greater than the system voltage and a tolerance voltage, the routine ends.

As the full loading of nodes and/or the current flow through the power connectors 146, cause a rising temperature, the CMC 120 will compensate for the drop by increasing the voltage levels of the PSUs 110, 112, 114 and 116. The CMC 120 will perform the compensation by regulating the voltage drop feedback via a control signal to fine-tune the value of the digital variable resistor 122 to match the detected operational conditions.

The feedback control signal of the CMC 120 to adjust the voltage output level of the power supply units is calculated by an MLP neural network that may be operated by the CMC 120. An MLP neural network is used in this example, but other types of neural networks such as a recurrent neural network (RNN) or a convolutional neural network (CNN) may be selected based on their performance. Alternatively, a set of matrix operations may be performed to determine the optimal voltage output levels of the power supply units to address the temperature rise effects. For example, when power supply voltage is adjusted to 13V from 12V (e.g., an increase by 8.3%), the system current will decrease 8.3% at the same power consumption. Consequently, the temperature rise and voltage drop over a mechanical component are decreased by 16%. The CMC 120 will also control the speed of the fans of the fan board 152 to increase or decrease cooling, to control dissipation of heat, thereby also controlling temperature rise effects. The CMC 120 also includes an algorithm to predict the lifetime of mechanical components by determining the effects of temperature rise.

Figure 6A:
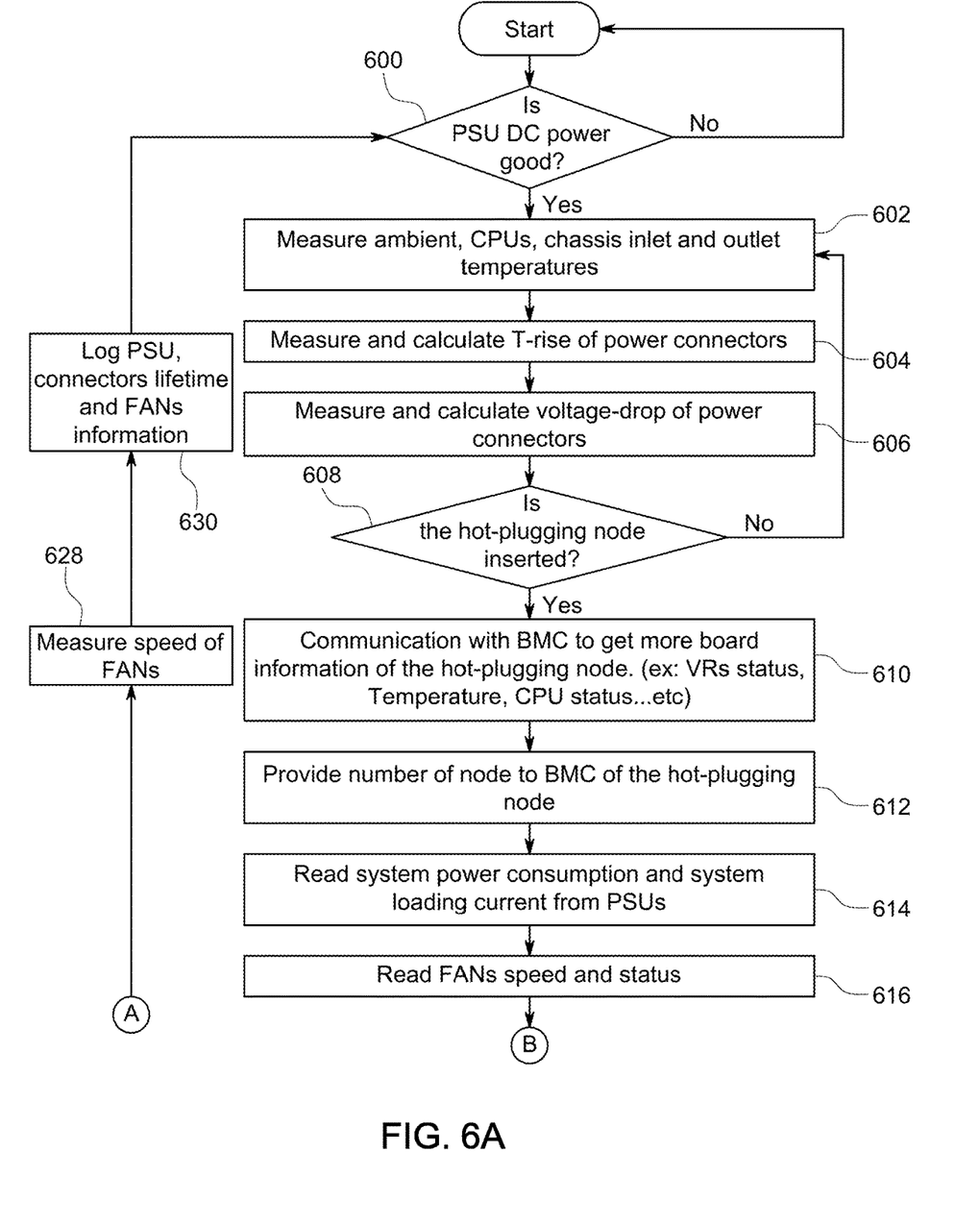
FIGS. 6A-6B is a flow diagram of the routine executed by the CMC in the system shown in FIG. 3 on startup.
Figure 6B:
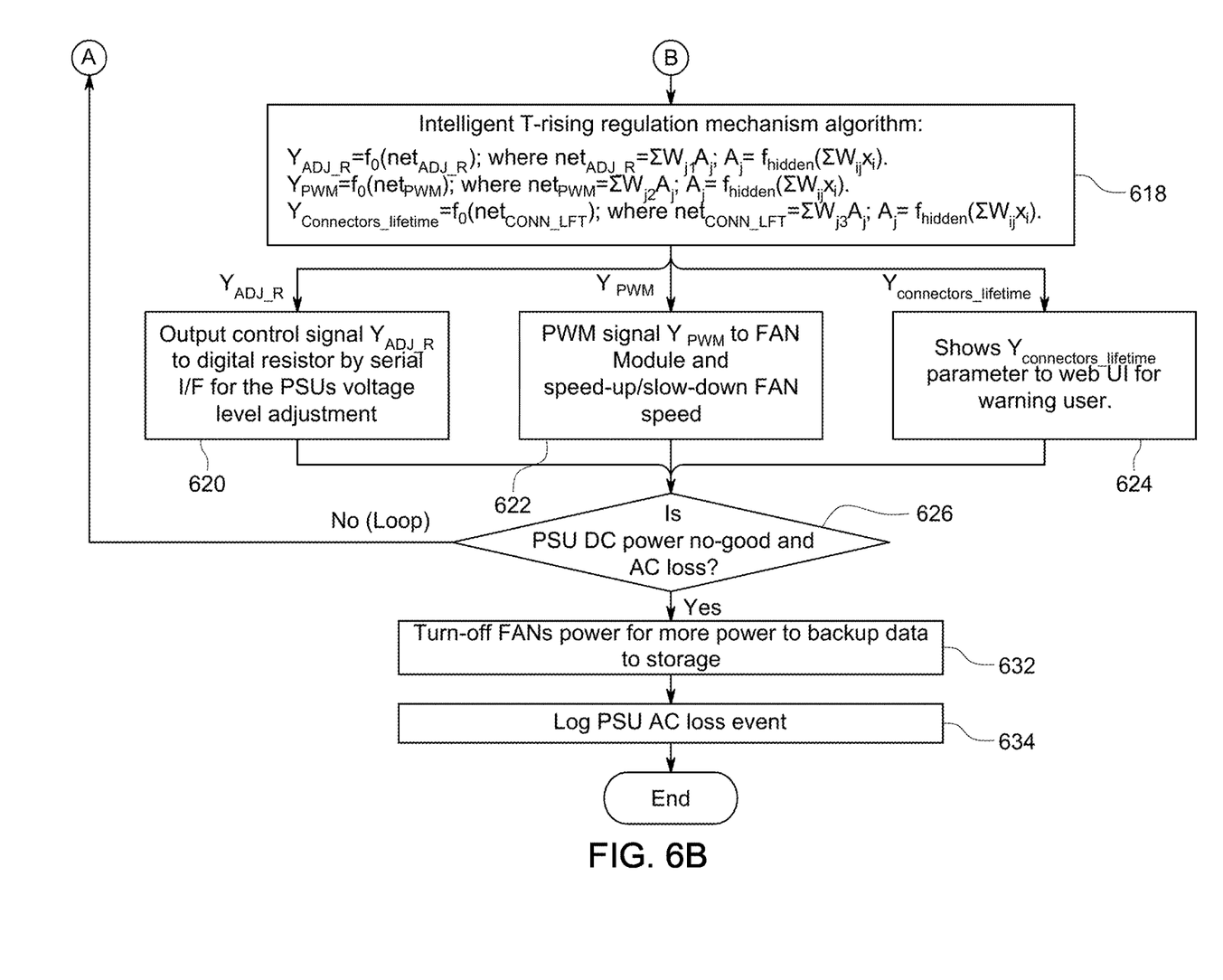

FIGS. 6A-6B is a flow chart of the routine followed by the example intelligent temperature rise regulation mechanism that allows the CMC 120 in FIG. 3 to increase or decrease the voltage level for thermal regulation, predict the lifetime of mechanical components, and control fans to address the effects of temperature rise. The routine first determines whether there is acceptable DC power output from the PSUs 110, 112, 114, and 116 in FIG. 3 (600). If no DC power is output, then the routine loops back to the start. If DC power is output, the routine senses the ambient temperature, CPU temperature, and the chassis inlet and outlet temperatures (602). An electrical temperature sensor is located in the interior of the chassis to determine the inlet temperature, which is the internal temperature of the chassis. Another electrical temperature sensor is located on the exterior of the chassis such as near an input/output port to determine the outlet temperature, which is the temperature of the environment external to the chassis. The routine then measures the temperature rise of the power connectors via a temperature sensor in proximity to the power connectors (604). The routine then measures the voltage drop of the power connectors via voltage sensors on the power connectors (606).

The routine then determines whether a hot plugging node, such as a computing node, a storage node or a GPU cluster node, has been inserted in the chassis (608). If there has been no new node inserted, the routine loops back to measure ambient temperatures (602). If a new node has been inserted (608), the CMC 120 communicates with the BMC of the new node to receive operating information such as voltage and resistance status, temperature, CPU status, etc. (610). The CMC 120 then requests the address of the node from the BMC of the new node (612). The routine then reads system power consumption and system loading current from the PSUs 110, 112, 114, and 116 (614). The CMC 120 then reads the speed and status of the fans on the fan board 152 (616).

The CMC 120 uses the neural net algorithm to determine the value of the adjustable resistor, the value of the fan control signal, and the data for lifetime prediction for mechanical components (618). As will be explained below, the calculated resistance value of the adjustable resistor 122 allows efficient voltage compensation for temperature rise effects on the connectors. The calculated fan control values allow optimal cooling output from fans to mitigate temperature rise effects on the power connectors. The lifetime data allows storing and analysis of data to predict the lifetime of the mechanical power connectors.

The routine applies the calculated value of the adjustable resistor to the adjustable resistor 122 (620). The routine applies the calculated value for fan control signals to the fan board 152 to control the fan modules (622). The routine generates a display on a user interface to show the expected lifetime of critical mechanical power connectors (624). After the adjustments, the routine determines whether the DC power from the PSUs is within parameters and whether the AC supply is connected (626). If the DC power is within parameters or if the AC supply is connected, the routine measures the fan speed (628). The routine then logs the power supply information, fan information, and the lifetime prediction data (630). The logged data may be used for an operator to assist in monitoring the operation of the system 100. The routine then loops back and determines whether the DC power is within acceptable limits (600).

If the DC power is not within acceptable limits, and AC power is not connected (626), the routine turns off power to the fans to allow more power to be supplied to backup cache data to a storage device (632). The routine then logs a PSU AC input loss (634).

The above described routine allows the CMC 120 to monitor the temperature rise effects of mechanical connectors. In response to the temperature rise effects, the CMC 120 may adjust the digital resistor value ($Y_{ADJ\_R}$) of the digital variable resistor 122 to increase or decrease the voltage level across the mechanical power components. In response to the temperature rise effects, the CMC 120 may provide a thermal regulation ($Y_{PWM}$) pulse width modulation signal to the fans on the fan board 152 to mitigate the temperature rise. Thus, the optimal addressing of temperature rise effects in some cases could be a combination of voltage input signal via adjusting the digital resistor value ($Y_{ADJ\_R}$) and an increase in fan speed via the PWM signal ($Y_{PWM}$). In some cases, the optimal addressing of temperature rise effects may be through only adjusting the digital resistor or only increasing fan speed. The CMC 120 may also predict the lifetime ($Y_{connectors\_lifetime}$) of mechanical power components. The voltage drop of the connector ($V_{drop\_connector}$) is a function of the system current and the internal resistance of the connector according to $V_{drop\_connector} = I_{sys} * R_{connector\_internal}$. The values of $V_{drop\_connector}$ and $I_{sys}$ are already measured and calculated in the process.

The value of the internal resistance of the connector and the cables may be obtained via a look-up table of connector or cable cycles using time versus resistance to predict connector lifetime. The internal electrical resistance is directly related to predictions of connector lifetime. Electrical connectors play a critical role on system reliability. Environment stresses of temperature, particulate contamination, assembly issues and mechanical vibration are critical environmental factors which affect the reliability and lifetime of such connectors. As will be explained below, the internal resistance values can be input to a neural network. Such a neural network may be trained based on the connector or cable cycles using time versus resistance, to predict connector lifetime.

The flow diagram in FIG. 5 is a representative of example machine readable instructions for the initialization and calibration routine for the CMC 120 in FIG. 3. The flow diagram in FIGS. 6A-6B is representative of example machine readable instructions for the monitoring routine for the CMC 120 in FIG. 3. In this example, the machine readable instructions for both FIGS. 5 and 6 comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowcharts may be implemented manually. Further, although the example algorithm is described with reference to the flowcharts illustrated in FIG. 5 or 6A and 6B, persons of ordinary skill in the art will readily appreciate that many other methods of implementing the example machine readable instructions may alternatively be used. For example, the order of execution of the blocks may be changed, and/or some of the blocks described may be changed, eliminated, or combined.

The CMC 120 gathers relevant information including temperature, the status of all of the nodes, the change in temperature from current flow, voltage drops, and other relevant parameters as explained with reference to the routine in FIGS. 6A-6B. The parameters are fed to a multi-level perception (MLP) neural network. The MLP will output the resulting values of the digital resistor value ($Y_{ADJ\_R}$), the thermal regulation signal ($Y_{PWM}$), and lifetime data ($Y_{connectors\_lifetime}$). The CMC 120 will use these values to increase or decrease the voltage level across the power mechanical components and provide the thermal regulation signal to the fans to mitigate the temperature rise. The CMC 120 may also predict the lifetime ($Y_{connectors\_lifetime}$) of mechanical power components As explained below, the adjustable resistor value ($Y_{ADJ\_R}$) will result in increasing or decreasing the output voltage of the PSUs 110, 112, 114, and 116 (in FIG. 3) across the mechanical power components (e.g., connectors and cables), based on the RS+ feedback control signal. As shown in FIG. 4, the RS+ and RS− control signals are fed to operational amplifiers of the PSUs 110, 112, 114, and 116 in FIG. 3. The output of the PSUs 110, 112, 114, and 116 are based on the output of the operational amplifier 220 in FIG. 4 to adjust the output voltage level.

The determined thermal regulation signal ($Y_{PWM}$) will speed-up or slow-down fan speed to control heat dispersion for the chassis server system including heat dispersion from the mechanical power components. The increase in heat dispersion reduces the effects of temperature rise on the mechanical power components. The $Y_{connectors\_lifetime}$ signals are logged and used for a web based user interface display. The web based user interface may make an operator aware of the status of power mechanical components including projected lifetime and contact electrical resistance.

Figure 7:
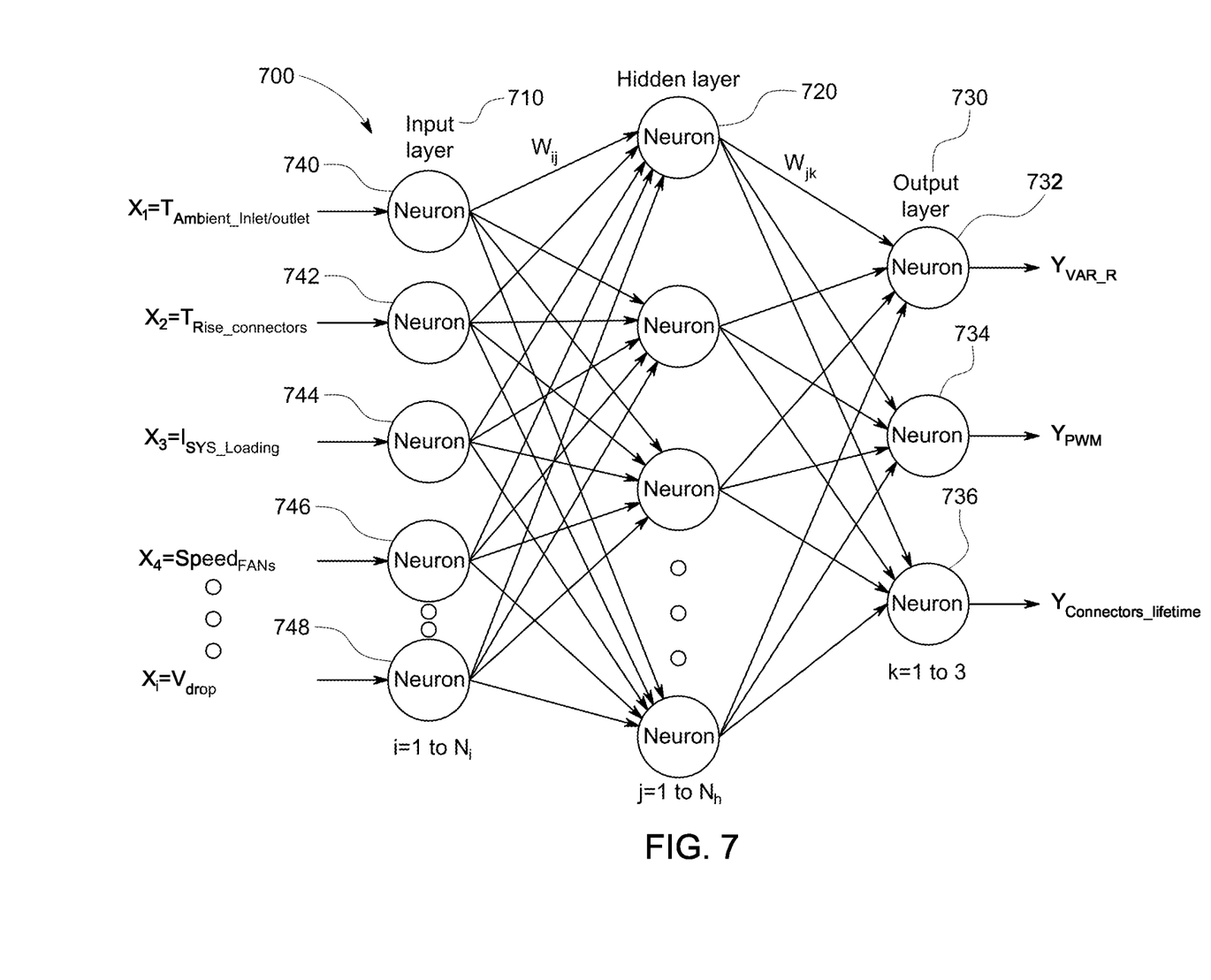
FIG. 7 is a neural net used to learn the optimal voltage compensation levels.

The relevant parameters (e.g., temperature, current, voltage drops, etc.) are used as inputs to a multi-layer perceptron (MLP) neural network that is executed by the CMC 120 or any other suitable processing device. An example MLP neural network 700 is shown in FIG. 7. The neural network 700 is a feed forward artificial neural network. The MLP neural network 700 consists of at least three layers of nodes. A first set of nodes 710 constitute an input layer, a second set of nodes 720 constitute a hidden layer, and a third set of nodes 730 constitute an output layer. As shown in FIG. 7, input values 740 to the input layer nodes 710 constitute ambient temperature measurements, the measured temperature rise of the connectors, the input current of the system load, and the measured voltage drops. Each input layer node 710 and hidden node 720 is a neuron that uses a nonlinear activation function such as a sigmoid or soft-max function to determine an output value. The output node layer 730 in this example, includes an output node 732 outputting the digital resistor value ($Y_{ADJ\_R}$); an output node 734 outputting the thermal regulation ($Y_{PWM}$) signal to the fans to mitigate the temperature rise; and an output node 736 outputting a predicted lifetime value ($Y_{connectors\_lifetime}$) of mechanical power components.

In this example, the input nodes include input nodes 740, 742, 744, 746, and 748. Additional inputs may be determined by big data analysis to identify which inputs are a major parameter input for predictions. For example, principal component analysis may be used to identify a major parameter for inputs. The input node 740 accepts an input of the ratio of inlet ambient temperature to outlet ambient temperature as measured by respective temperature sensors. The input node 742 accepts an input of the temperature rise of the mechanical power connectors as measured by corresponding temperature sensors. The input node 744 accepts an input of the current of the loads consuming power in the server 100 in FIG. 3, as determined from data from the BMCs from each node. The input node 746 accepts an input of the speed of the fans as determined by the control signals sent by the CMC 120 to the fans on the fan board 152 in FIG. 3. The input node 748 represents additional input nodes that each accept an input of the sensed remote voltage drop from the connection to an individual computing node and the computing node themselves in FIG. 3 as determined by the CMC 120. Each of the hidden layer nodes 720 includes inputs that are coupled to each of the input nodes 740, 742, 744, 746, and 748 of the input node layer 710. The hidden layer nodes 720 include weighting values that are applied to the input values received from each of the input nodes 740, 742, 744, 746, and 748. The output nodes 732, 734, and 736 include inputs that are coupled to each of the hidden nodes in the hidden layer 720.

The weighting values used by the MLP neural network 700 in FIG. 7 are determined by supervised learning from a training data set. The neural network 700 is fed a training set that includes the desired solutions, called labels. For example, a training data set may include a current value of the system (Isystem_loading=95%), the temperature rise of the connectors (Trise_connectors=25 degrees), and a labeled fan control value (PWM=80%), when all of the nodes are installed in the chassis. Other labeled values may include the digital resistor value and the lifetime prediction data. The training set is used for the MLP 700 to learn weight vectors, Wij and Wjk, of the hidden layer of nodes 720 in FIG. 7. This learning mechanism from the training dataset may be thought of as a teacher supervising the learning process. The correct answer is known and the algorithm iteratively predicts the training data and is corrected by the teacher. Learning stops when the algorithm achieves an acceptable level of performance as measured by the outputs compared with the desired results of the training set.

Figure 8:
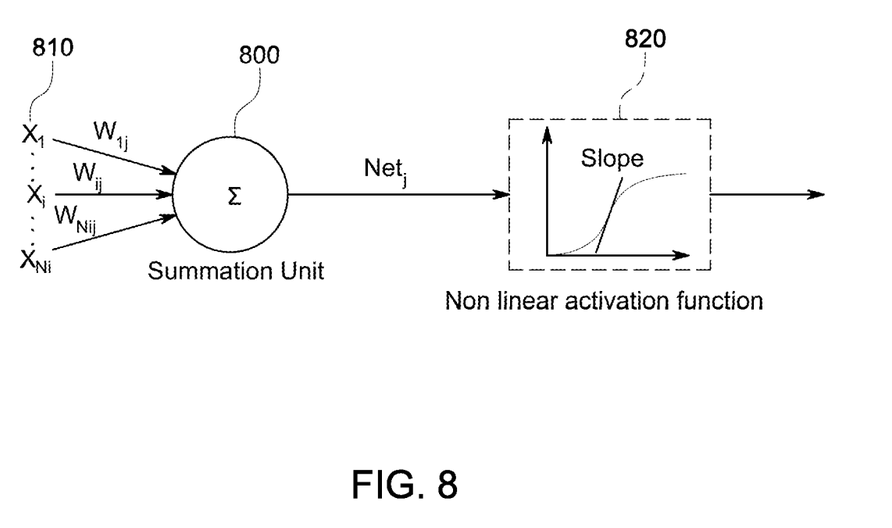
FIG. 8 is a node of the neural net in FIG. 7 that is used to determine optimal weighting for the learning process of the neural net.

FIG. 8 shows an example hidden layer node 800. The hidden layer node 800 has a series of inputs 810 that are output by the input layer nodes 710 in FIG. 7. As shown in FIG. 7, the outputs of all of the input layer nodes 710 are input to each of the hidden layer nodes 720. The outputs are based on weighting vector values that are proportional to the importance of the input values. In this example, the hidden layer node 800 is a summation function that produces a nonlinear activation function 820.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A sensing and compensation system for temperature effects based on current carried by power connectors, the system comprising:
   a power supply unit having an adjustable voltage output and a feedback circuit, wherein the voltage output is adjusted based on the output of the feedback circuit;
   a power path coupled to the power supply unit, wherein the power path having power connectors to supply voltage from the power supply unit to a remote node, the remote node operable to sense a voltage drop of the power path at the remote node associated with temperature effects on the power connectors;

an adjustable resistor having an output coupled to the feedback circuit; and a controller coupled to the remote node and the adjustable resistor, wherein the controller is operable to:

determine a resistance value to compensate for the temperature effects by executing a neural network having input nodes, hidden nodes having inputs coupled to each of the input nodes, weighting factors, and outputs, and at least one output node having inputs coupled to the outputs of each of the hidden nodes, the input nodes including an input node to accept the sensed voltage drop, and the at least one output node outputting the resistance value to control the adjustable resistor; and set the adjustable resistor to the determined resistance value to change the power output.

2. The system of claim 1, further comprising a power distribution board, wherein the adjustable resistor and controller are on the power distribution board, and wherein the controller is a chassis management controller.

3. The system of claim 1, wherein the remote node is one of a server or a storage device backplane.

4. The system of claim 1, further comprising a fan board having fans in proximity to the power connectors, the controller further operable to control the speed of the fans to compensate for temperature effects on the power connectors.

5. The system of claim 1, wherein the controller is further operative to determine data associated with the lifetime of the power components based on the sensed voltage drop.

6. The system of claim 1, wherein the input nodes include an input node for accepting ambient temperatures of the system, an input node for accepting a temperature rise of the power components, an input node for accepting a current through the power components, and an input node for accepting a speed of fans on a fan board in proximity to the power components.

7. The system of claim 6, wherein the output nodes include an output node outputting a value to control the speed of the fans and an output node outputting a predictive value associated with the lifetime of the power components.

8. The system of claim 7, further comprising a web enabled device coupled to the controller, the web enabled device operable to display a web based interface to display the lifetime of the power components.

9. The system of claim 1, wherein the feedback circuit is an operational amplifier.

10. The system of claim 1, wherein the remote node includes a baseboard management controller in communication with the controller, the baseboard management controller operable for sensing the voltage drop from the remote node.

11. The system of claim 10, wherein the baseboard management controller sends voltage drop data to the controller via a bus.

12. A method of compensating temperature effects on power connectors for a system having a power supply unit; a power path coupled to an output of the power supply unit; a remote node powered by the power supply unit through the power path and the power connectors; and an adjustable resistor having an output coupled to a feedback circuit of the power supply unit to regulate the output of the power supply unit, the method comprising:

sensing a voltage drop of the power path at the remote node associated with temperature effects on the power connectors;

determining a resistance value for the adjustable resistor based on the sensed voltage drop via a controller executing a neural network having input nodes, hidden nodes having inputs coupled to each of the input nodes, weighting factors, and outputs, and at least one output node having inputs coupled to the outputs of each of the hidden nodes; the neural network providing an input node to accept the sensed voltage drop and reading the output of one output node to determine the resistance value; and adjusting the resistance of the adjustable resistor to change the output of the power supply unit to compensate for the temperature effects.

13. The method of claim 12, further comprising:

determining a fan speed value based on the sensed voltage drop; and based on the fan speed value, controlling the speed of fans on a fan board in proximity to the power connectors to compensate for the temperature effects.

14. The method of claim 12, further comprising determining data associated with the lifetime of the power components based on the sensed voltage drop.

15. The method of claim 10, wherein the input nodes include an input node for accepting ambient temperatures of the system, an input node for accepting a temperature rise of the power components, an input node for accepting a current through the power components, and an input node for accepting a speed of fans on a fan board in proximity to the power components.

16. The method of claim 15, wherein the output nodes include an output node outputting a value to control the speed of the fans and an output node outputting a predictive value associated with the lifetime of the power components.

17. The method of claim 16, further comprising:

communicating the predictive value to a web enabled device coupled to the controller; and displaying a web based interface to show the lifetime of the power components.

18. A system sensing and compensating for temperature effects on power components, the system comprising:

a power distribution board;

a power supply unit mounted on the power distribution board, the power supply unit including a feedback circuit and an adjustable voltage output;

a plurality of nodes including a computing node, a storage backplane node, and a fan board node, each of the plurality of nodes coupled to the adjustable voltage output of the power supply unit via power connectors, wherein the fan board node includes fans in proximity to the power connectors;

a controller mounted on the power distribution board, wherein the controller is operable to control the speed of the fans on the fan board node; to receive voltage drop data from each of the plurality of nodes, and temperature data from temperature sensors on the power connectors; and to execute a neural network having input nodes, hidden nodes having inputs coupled to each of the input nodes, weighting factors, and outputs, and at least one output node having inputs coupled to the outputs of each of the hidden nodes; and an adjustable resistor coupled to the controller, one input of the adjustable resistor coupled to the feedback circuit, wherein the neural network determines a value for the adjustable resistor to control voltage output of the power supply unit and a fan speed for the fans to compensate for temperature effects of the power connectors by providing an input node to accept the sensed voltage drop and reading the output of one output node to determine the value for the adjustable resistor.

* * * * *